(12) United States Patent
Deas et al.

(10) Patent No.: US 7,203,243 B2
(45) Date of Patent: Apr. 10, 2007

(54) LINE DRIVER WITH REDUCED POWER CONSUMPTION

(75) Inventors: Alexander Roger Deas, Edinburgh (GB); Igor Anatolievich Abrosimov, St. Petersburg (RU)

(73) Assignee: Acuid Corporation (Guernsey) Limited, St. Peter Port, Guernsey British Isles ( * ) Notice: Subject to any disclaimer, the term of this patent is extended or adjusted under 35 U.S.C. 154(b) by 791 days.

(21) Appl. No.: 10/384,266

(22) Filed: Mar. 10, 2003

(65) Prior Publication Data

US 2004/0179624 A1    Sep. 16, 2004

(51) Int. Cl.
*H04B 3/00*    (2006.01)
*H04L 25/00*   (2006.01)

(52) U.S. Cl. .................. 375/257; 375/259; 326/87; 326/106

(58) Field of Classification Search ........... 375/257, 375/259, 219, 220; 326/87; 327/166; 365/227
See application file for complete search history.

(56) References Cited

U.S. PATENT DOCUMENTS

| | | | |
|---|---|---|---|
| 4,630,284 A * | 12/1986 | Cooperman | 375/257 |
| 4,728,822 A | 3/1988 | Kusaka et al. | 307/448 |
| 4,758,743 A | 7/1988 | Dehganpour et al. | 307/443 |
| 4,933,579 A * | 6/1990 | Isobe et al. | 327/166 |
| 5,128,555 A | 7/1992 | Millman | 307/443 |
| 5,263,001 A * | 11/1993 | Youn et al. | 365/227 |
| 5,319,260 A | 6/1994 | Wanlass | 307/443 |
| 5,495,187 A | 2/1996 | Martin | 326/33 |
| 5,717,343 A | 2/1998 | Kwong | 326/27 |
| 6,518,792 B2 * | 2/2003 | Jong et al. | 326/87 |
| 2006/0126745 A1* | 6/2006 | Haq et al. | 375/257 |

FOREIGN PATENT DOCUMENTS

JP    59 095730    6/1984

* cited by examiner

*Primary Examiner*—Phuong Phu

(57) ABSTRACT

A means for reducing the power consumption of the transmitter by storing the recent history of the transmitted data using a string of gates with taps from the string taken at points determined by the propagation delay of each gate and controlling driving transistors as a function of comparison of that history with input data so that, either the signal is driven into the transmission line at full strength, or at a level near the minimum needed to retain the state in the receiver.

The advantage of the invention is that the line capacitance decays through the terminating resistors or discharge transistors, such that when the next state change is needed, then line has less stored energy needing to be discharged.

20 Claims, 2 Drawing Sheets

LINE DRIVER WITH REDUCED POWER CONSUMPTION

BACKGROUND OF THE INVENTION

1. Technical Field

The present invention relates to the communication of signals, in particular, to the transmission and reception of digital signals, where the signals are at a very high frequency.

The present invention is particularly applicable to interfaces between integrated circuits and for high speed communications, such as currently addressed by Asynchronous Transfer Mode (ATM), Gigabit Ethernet, SONET, 3GIO, RapidIO, Hyperchannel and Fibre Transmission Channels.

2. Background of the Invention

The input buffers to an integrated circuit comprise a series of open loop amplifiers, commonly of an inverting type (inverters). This means that the input signal need only switch a few millivolts around a voltage threshold, plus a noise margin, for the signal to switch logic states, the minimum Vil and Vih levels.

Transmission lines between integrated circuits are predominantly capacitive in their characteristic at very high frequencies. This means that to change state quickly, it is necessary to charge the line from a voltage source well above the Vih and to discharge the line to well below the Vil. It has been the practice to use saturating transistors which pull the line to a low value or drive it to a high value, then for this voltage to remain on the line until the next change is required.

In a digital system, the number of transitions in a pulse stream is normally much less than the clock frequency. The drive levels in a saturated system as described above mean that unless the signal changes polarity on the very next cycle, then the driver is storing energy on the line which must be discharged by the next transition.

The energy stored on a capacitor is QV/2 where Q is the charge in coulombs, or $CV^2/2$. Thus, if there are f transitions a second, the energy required to drive a line is:

$$E := 2f\, CV^2/2$$

In a system where a line is driven to 1V for a high and 0V for a low, running at 10 GHz, with a line capacitance of 100 pF, then the energy required is 1 W, or 2 W for each differential pair.

Assuming a 20 mV noise window is required, and the switching threshold has a 6 mV hysteresis, then the energy actually needed to send the data is very much lower, as given by the equation:

$$Ea := 2fC(V+0.016)^2/2 - 2f\, C(V-0.016)^2/2.$$

If the driver were to try to drive a signal from Vt+0.016V and Vt−0.016V then the signal would take many time constants to change state: in theory, an infinite number. Therefore to send the data, the driver must slew the signal at the required rate, and this means driving the capacitive loads from a higher voltage than is needed purely on threshold hysteresis and noise considerations alone.

The above consideration is effective and valid for low frequencies, where the signal is driving the whole transmission line up and down. At higher frequencies, the signal must drive that length of the line that is occupied by one bit: for example, assuming a propagation delay of 5.2 nS/m through a transmission line, then a system sending data at 190 MHz (380 Mbs) must charge and discharge one meter of transmission line on every bit change where the data is a clock signal. A typical coax cable has a capacitances that can vary from as low as 20 pF to as high as 200 pF/m. For example, Belden 8723 individually shielded twin twisted pairs have a capacitance of 203 pf/m core to cable+shield, whereas low capacitance RS485 cable is only 20 pF/m. More usually, cables are in the range 50 pF to 115 pF: for example TZC75024 75 Ohm telecom coaxial has a capacitance of 67 pF/m, RG58 A/U computer triax cable is 102 pf/m, 9903 Thin Ethernet cable is 114 pF/m, and Category 5 Belden 1583E unshielded twisted pair has a capacitance of 50 pF/m. Capacitances of pcb traces are usually in a similar range. These are very large values of capacitive loading for MOS drivers.

In high speed systems, the data is usually encoded, for example 8b/10b encoding is used to achieve a DC balanced code with a bit change every 16 bits. The newly invented 8b/13b codes and 8b/16b codes by the same inventors of the present invention described in UK 0202366.1 reduces the number of bit changes for any given channel bandwidth. For example the 8b/13b coding scheme gives a bit changes at less than $\frac{1}{3}^{rd}$ of the data rate. In this case, the length of the line being charged or discharged is increased, compared to sending a pure clock signal, and this again increases the power consumption in linear proportion to the ratio of the frequency of bit interval changes to the clock frequency. Thus, as the frequency of communication increases, the amount of capacitance seen by the driver does not reduce linearly, but reduces as a the product of the linear reduction in the length of the line being driven by the bit and the increase in bit length that is an artifact of the coding.

Another factor in very high speed systems is that the driver must be differential: without this the currents injected into the power supplies and the radiated energy becomes excessive. The power supply noise created on switching is a critical factor in these systems. Differential drivers use a constant current source and arrange the switching to drive that same current into one of two lines forming a signal pair at all times. If the current in the differential driver is modulated then large amounts of noise can be injected into the power and ground rails. Attempts to reduce the power consumption of the line and driver combination must accommodate these currents if they are to be capable of effective implementation.

In order to drive a large capacitive load, the driver requires a predriver, which increases the electrical energy that can be driven, ideally by a factor of 3 or so per stage. The predriver can often consume more power than the driver when there is a heavily capacitive load due to the reflected Miller capacitance.

An attempt to solve the above problems was made in Jong et al., U.S. Pat. No. 6,518,792 disclosing a method and circuitry for pre-emphasizing transmitted logic signals. The idea was to configure a driver circuit may for monitoring the logic values of signals transmitted by the driver circuit and comparing the logic value of a next logic signal to be transmitted with a first previously transmitted signal and a second previously transmitted signal. Pre-emphasis of the next logic signal occurred based on the logic value of the next logic signal to be transmitted as well as the logic values of the first and second logic signals. If the first and second logic signals had the same logic value, and the next logic signal has a different value, the next logic value was pre-emphasized. If the next logic signal had a logic value that is equivalent to either the first logic signal or the second logic signal, it was transmitted without pre-emphasis.

A circuitry for embodying this method includes a driver circuit having selection logic, a pre-emphasis controller, and an output circuit. However, power savings obtained by using the method and circuitry of Jong et al. are insufficient.

Selection logic 51 includes monitoring circuit 52, comparison logic 54, and pre-emphasis controller 56. The next logic signal to be transmitted, A(n), is received by a shift register in monitoring circuit 52. The shift register of monitoring circuit 52 is configured to capture the logic value of A(n), as well as the logic values of A(n−1) and A(n−2). With each clock cycle, the logic values in the shift register shift one place in the shift register. Thus, the shift register of monitoring circuit is able to store the state of the A(n), A(n−1), and A(n−2) for any clock cycle.

Thus, it can be seen that in the circuitry of Jong et al. the length of pre-emphasized signal is dictated by the clock signal. This may be tolerable at relatively low-speeds; however, high-speed communications can require shorter pre-emphasized signals.

In the above context, long pre-emphasized signals do not match high-speed communications and obviously lead to excessive power consumption.

BRIEF SUMMARY OF THE INVENTION

Object of the Invention

The present invention seeks to reduce the energy needed to drive a line by reducing the drive voltage or current after the state has changed providing means able to produce shorter pre-emphasized signals not determined by the clock.

Summary of the Invention

The present invention is a means to reduce the power consumption of a chip by sending state changes through at full drive strength, then reducing the strength such that the line capacitance decays through the terminating resistors or discharge transistors, such that when the next state change is needed, then line has less stored energy needing to be discharged.

In one aspect, the present invention provides a high speed communication system comprising a chip having a transmitter with a set of driving transistors for driving a signal representing transmitted data into a communication line connecting the transmitter and a receiver arranged on another chip, the transmitter comprising:

a means for reducing the power consumption of the transmitter, including:

a means for storing the recent history of the transmitted data;

a controlling means for switching on/off the set of driving transistors as a function of comparison of that history in a logic means with data at the input of the transmitter; and a set of keeper transistors for driving the signal into the transmission line at a level near the minimum needed to retain the state in the receiver, wherein the means for storing the recent history of the transmission line comprises a string of gates with taps from the string taken at points determined by the propagation delay of each gate.

Preferably, the number of taps, delay time between them and the form of the logic function for converting signals from these taps to the controlling means are determined by simulation process, such as SPICE model simulation.

The driver can be a single ended or a differential driver.

The controlling means may be an inverter, or a set of inverters.

The logic means may be a comparator, such as an XOR, or a look-up table.

According to one embodiment, the gates and the comparator may be scaled to act as a predriver. The predriver may be controlled by a controller in a similar manner as the driver.

The controlling means may comprise additional transistors in the driver forming an AND or NAND function with the driving transistors.

The set of keeper transistors may be sized according to termination resistors in the transmission line, such that the signal level is close to the voltage threshold of the receiver plus or minus a noise margin.

The transmission line may comprise a capacitive load.

In another aspect, the invention is a method of reducing the power consumption of a transmitter in a high speed communication system comprising a chip having a transmitter with a set of driving transistors for driving a signal representing transmitted data into a communication line connecting the transmitter and a receiver, the method comprising the steps of:

storing the recent history of the transmitted data;

comparing the history of the transmitted data with data at the input of the transmitter to enable one of the following steps:

changing the V-I characteristic of the transmitter to increase the output current of the transmitter to change the transmission line state in a required time interval; or, changing the V-I characteristic of the transmitter to maintain the transmission line state at a level sufficient only to maintain the state of the receiver, wherein recent history of the transmission line is stored using a string of gates with taps from the string taken at points determined by the propagation delay of each gate.

Preferably, the V-I characteristic of the transmitter is changed by varying the position and number of taps in the means for storing the recent history of the transmitted data.

The V-I characteristic may be changed in other ways, including varying the number of switched on transistors at the output of the driver, or, the number of delays, or the form of the logic function.

In still another aspect, a means for reducing power consumption in a high speed communication system comprising a chip having a transmitter with a set of driving transistors for driving a signal representing transmitted data into a communication line connecting the transmitter and a receiver, the means for reducing power consumption comprising:

a means for storing the recent history of the transmitted data;

a controlling means for switching on/off the set of driving transistors as a function of comparison of that history in a logic means with data at the input of the transmitter; and a set of keeper transistors for driving the signal into the transmission line at a level near the minimum needed to retain the state in a receiver;

wherein the means for storing the recent history of the transmission line comprises a string of gates with taps from the string taken at points determined by the propagation delay of each gate.

BRIEF DESCRIPTION OF THE SEVERAL VIEWS OF THE DRAWINGS

For a better understanding of the present invention and the advantages thereof and to show how the same may be carried into effect, reference will now be made, by way of example, without loss of generality, to the following description now taken in conjunction with the accompanying drawings in which.

DETAILED DESCRIPTION OF THE INVENTION

Figure 1:
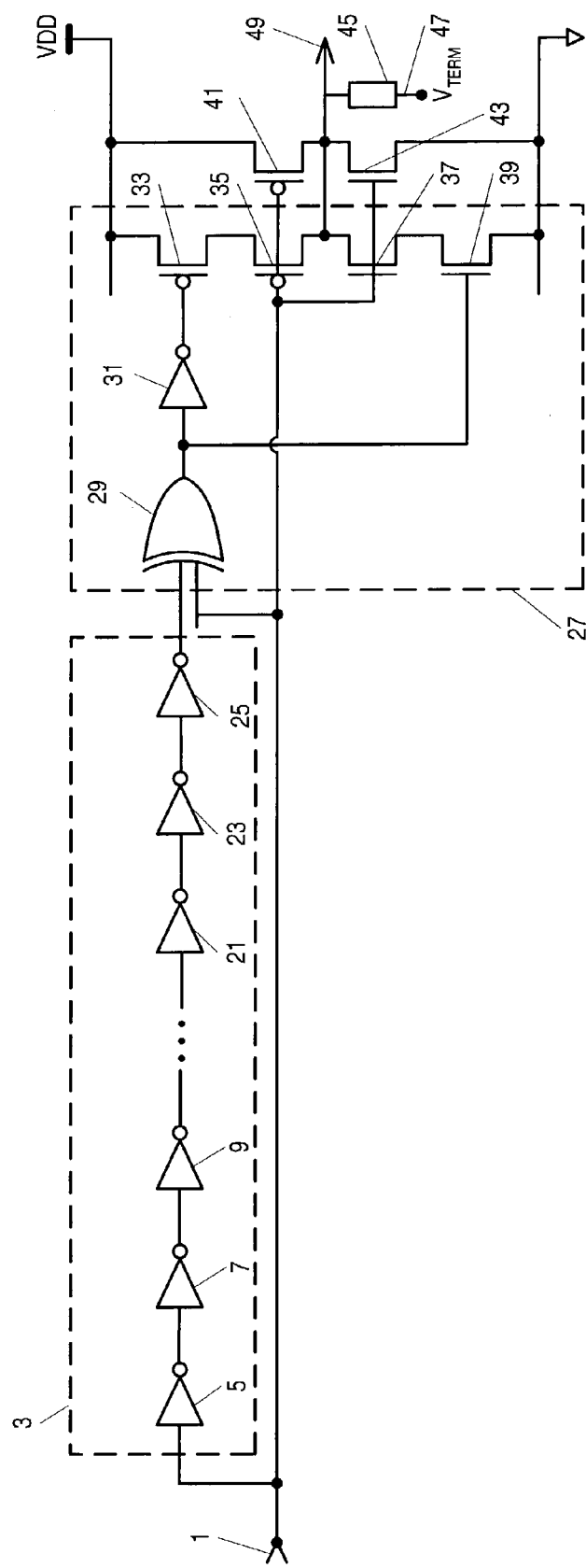
FIG. 1 shows a general block diagram of the driving means embodying the present invention.

A detailed description of the present invention will now be given, without loss of generality, and with reference to the following figures:

A block diagram in FIG. 1 shows an embodiment of the present invention in which an input signal 1 drives a transmitter comprising a strong transistor set 33, 35, 37 and 39 for driving a signal at a high slew rate, i.e. at a slew rate sufficient to change the transmission line state in required time interval, and a weak transistor set 41 and 43 for maintaining the transmission line state at a level sufficient to maintain the state of a receiver at the other end of the transmission line. The output line is terminated to a terminating voltage Vt by a resistance 45.

The strong transistor set is driven for a short interval such as by a delayed instance of the input signal 1 using a delay chain 3 comprising a series of inverters 5, 7, 9 to 21, 23, 25. The delay chain 3 stores the recent history of the transmission line, i.e. the state of the input of the transmitter at a predetermined time interval in past.

Alternatively, the delay chain 3 may comprise a string of gates with taps from the string taken at points determined by the propagation delay of each gate. The number of taps, delay time between them are determined by simulation process, such as SPICE model simulation.

The signals from the delay chain are compared with the input signal 1 by a logic means 29, e.g. a comparator gate such as an XOR 29, or a look-up table and converted to inverter 31. The inverter 31 (or, a set of inverters) controls the driving transistors depending on the history of the transmitted data.

When the inverter 31 switch on the set of driving transistors 33,35,37,39, the V-I characteristic of the transmitter is changed so that to increase the output current of the transmitter and thereby, to change the transmission line state in a required time interval, i.e. at a required for the particular application high slew rate.

When the set of driving transistors 33,35,37,39 is switched off, the transmission line state is kept at a level sufficient only to maintain the state of the receiver by the set of transistors 41,43.

The V-I characteristic depends on the number of switched on transistors. By increasing the number of switched on transistors, we can increase the output current of the transmitter at a given voltage.

The circuit in FIG. 1 operates as follows.

Consider the case where the number of inverters in the chain is even, and comprises inverters 5, 7, 9, 21, 23, 35, as shown in the figure, and XOR element is used as a comparator 29. Thus, if the state of the transmission line remains constant for a period exceeding the delay in the chain 3 of inverters, the output of the comparator is "zero" and the output of inverter 31 is "one" that causes the switch off of transistors 33 through 39, thereby reducing power supply current.

When the input signal 1 changes, the set of transistors 33 through 39 switches on for a time period equal to the delay time of the chain 3, thereby increasing the driving strength of the transmitter, thus providing the faster slew rate of a signal at the output of the transmitter.

When the time defined by the chain 3 delay elapses, the set of transistors 33 through 39 are switched off again, while the set of transistors 41, 43 continues keeping the signal at a level sufficient to maintain the determined logical levels at the input of the receiver, i.e. at the end of the transmission line.

Figure 2:
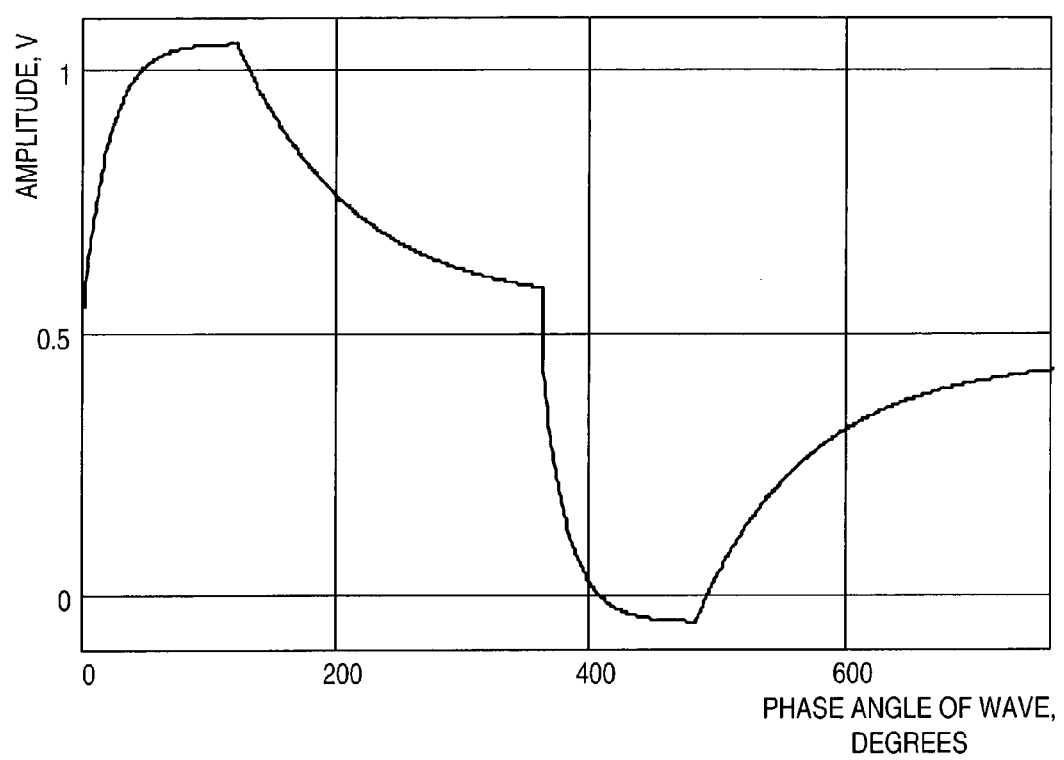
FIG. 2 shows a waveform at the output of the driver illustrating a greatly reduced voltage on the line at the point of at which it switches.

The result is an output signal 49 which has an initial value shortly after switching which is further from the switching threshold than after a longer interval after switching states. FIG. 2 shows the waveform at the output of the transmitter showing a greatly reduced voltage on the line at the point of at which it switches. The figure shows a data transitions at 33% of the main clock frequency, such as occurs randomly in data, or is characteristic of data that has been encoded to maximise the length of the minimum pulses. The Y Axis shows the amplitude in volts and the phase angle along the X axis in degrees.

The following description will assume the driver is a voltage driver, but it will be apparent to a person skilled in the art of designing high speed electronic systems that the invention may be applied equally to current mode drivers. The modifications required for this type of implementation are obvious to such a person.

Similarly for clarity of this description, the transistor sizing and pre-driver is ignored as these are calculated routinely to provide the optimum data transfer into the driver transistors. The description will focus on the single ended driver initially, and then move onto consider differential drivers where there is an added requirement for a current balance to reduce noise injected into the power rails.

The exact form of the drive signal depends on the characteristics of the channel. The following information must be determined:

1. The voltage hysteresis of the channel.
2. The noise margin that must be maintained.

The sum of these two voltages determine the minimum voltage that must be maintained on the channel. The weak output drive transistors under worst case conditions must maintain this voltage when on: the transistors are sized or connected with series resistors such that they form a potential divider with the terminating components in the channel such that the resulting voltage varies from the threshold voltage by only the amount actually required to maintain the logic state in the receiver under worst case conditions.

The strong drive is a conventional current driver but with appropriate transistor sizing, such that the maximum slew rate that is required in the system is achieved.

The strong drive comprises a delay stage 3, and a drive stage 27, which together normally includes the obvious pre-drivers. The length of the delay stage is preferably not longer than half of one bit interval in a single ended implementation of the present invention.

In the case of a differential driver, an additional consideration is the need to reduce noise injected into the power rails: this is typically one tenth the noise injected by an open ended system and is a primary reason for choosing differential drivers in high frequency systems.

In this case, the waveform required for the strong drive stage and the decay into the weak transistors can be complex. The waveform that can be tolerated by the system can be determined using extraction and HSPICE modelling of the driver, its package and surrounding circuitry. Once this tolerable noise profile has been determined, it is preferable to use a series of taps from the delay stage 3, to drive a set of strong drivers 27, such that each strong driver operates in turn. For any given drive waveform that is indicated from simulation of the power rail noise tolerance, it is possible to create a series of strong drive stages to maintain the signal within that envelope. In this case, the first stage may not be the strongest, but the power level may be built up and then decay as the various drive stages come into play. The circuit given in FIG. 1 is effective in producing pulses that are initiated on the leading edge of the transition.

In many cases where the driver is differential, it is necessary to add a further delay chain such that particular strong drive stages are delayed from the leading edge of the transition in order to maintain the signal within the power rail noise limits that have been predetermined.

We claim:

1. A high speed data transmission system comprising a chip having a transmitter with a set of driving transistors for driving a signal representing transmitted data into a communication line connecting the transmitter and a receiver, the transmitter comprising:
    a means for reducing the power consumption of the transmitter, including:
        a means for storing the recent history of the transmitted data;
        a controlling means for switching on/off the set of driving transistors as a function of comparison of that history in a logic means with data at the input of the transmitter; and
        a set of keeper transistors for driving the signal into the transmission line at a level near the minimum needed to retain the state in the receiver;
    wherein the means for storing the recent history of the transmission line comprises a string of gates with taps from the string taken at points determined by the propagation delay of each gate.

2. The system according to claim 1, wherein the number of taps, delay time therebetween and a form of a logic function for converting signals from these taps to the controlling means are determined by simulation process.

3. The system according to claim 1, wherein the controlling means comprises an inverter.

4. The system according to claim 1, wherein the logic means comprises a comparator.

5. The system according to claim 1 wherein the logic function is implemented as a look-up table.

6. The system according to claim 1, wherein the gates and the logic function are scaled to act as a predriver.

7. The system according to claim 1, wherein the controlling means comprises additional transistors in the driver forming an AND or NAND function with the driving transistors.

8. The system according to claim 7 wherein the controlling means is applied to the predriver.

9. The system according to claim 1, wherein the set of keeper transistors are sized according to termination resistors in the transmission line, such that the signal level is close to the voltage threshold of the receiver plus or minus a noise margin.

10. The system according to claim 1, wherein the transmission line comprises a capacitive load.

11. The system according to claim 1, wherein the transmitter comprises differential drivers.

12. A method of reducing the power consumption of a transmitter in a high speed communication system comprising a chip having the transmitter with a set of driving transistors for driving a signal representing transmitted data into a communication line connecting the transmitter and a receiver arranged on another chip,
    the method comprising the steps of:
        storing the recent history of the transmitted data;
        comparing the history of the transmitted data with data at the input of the transmitter to enable one of the following steps:
        changing the V-I characteristic of the transmitter to increase the output current of the transmitter to change the transmission line state in a required time interval; or,
        changing the V-I characteristic of the transmitter to maintain the transmission line state at a level sufficient only to maintain the state of the receiver, wherein the recent history of the transmitted data is stored using a string of gates with taps from the string taken at points determined by the propagation delay of each gate,
        wherein the V-I characteristic of the transmitter is changed by varying the number of switched on transistors at the output of the driver.

13. A method of reducing the power consumption of a transmitter in a high speed communication system comprising a chip having the transmitter with a set of driving transistors for driving a signal representing transmitted data into a communication line connecting the transmitter and a receiver arranged on another chip,
    the method comprising the steps of:
        storing the recent history of the transmitted data;
        comparing the history of the transmitted data with data at the input of the transmitter to enable one of the following steps:
        changing the V-I characteristic of the transmitter to increase the output current of the transmitter to change the transmission line state in a required time interval; or,
        changing the V-I characteristic of the transmitter to maintain the transmission line state at a level sufficient only to maintain the state of the receiver, wherein the recent history of the transmitted data is stored using a string of gates with taps from the string taken at points determined by the propagation delay of each gate,
        wherein the V-I characteristic of the transmitter is changed by varying the number of delays in the means for storing the recent history of the transmitted data.

14. A method of reducing the power consumption of a transmitter in a high speed communication system comprising a chip having the transmitter with a set of driving transistors for driving a signal representing transmitted data into a communication line connecting the transmitter and a receiver arranged on another chip,
    the method comprising the steps of:
        storing the recent history of the transmitted data;
        comparing the history of the transmitted data with data at the input of the transmitter to enable one of the following steps:
        changing the V-I characteristic of the transmitter to increase the output current of the transmitter to change the transmission line state in a required time interval; or,
        changing the V-I characteristic of the transmitter to maintain the transmission line state at a level sufficient only to maintain the state of the receiver, wherein the recent history of the transmitted data is stored using a string of gates with taps from the string taken at points determined by the propagation delay of each gate, wherein the V-I characteristic of the transmitter is changed by varying the position and number of type of taps in the means for storing the recent history of the transmitted data.

15. A means for reducing the power consumption of a transmitter in a high speed communication system comprising a chip having the transmitter with a set of driving transistors for driving a signal representing transmitted data into a communication line connecting the transmitter and a receiver arranged on another chip, the means for reducing the power consumption of the transmitter comprising:

a means for storing the recent history of the transmitted data;

a controlling means for switching on/off the set of driving transistors as a function of comparison of that history in a logic means with data at the input of the transmitter and a set of keeper transistors for driving the signal into the transmission line at a level near the minimum needed to retain the state in the receiver, wherein the means for storing the recent history of the transmission line comprises a string of gates with taps from the string taken at points determined by the propagation delay of each gate.

16. The means according to claim 15, wherein the number of taps, delay time therebetween and a logic function for converting signals from these taps to the controlling means are determined by simulation process.

17. The means according to claim 16, wherein the simulation process is SPICE model simulation.

18. The system according to claim 2, wherein the simulation process is SPICE model simulation.

19. The system according to claim 3, wherein the controlling means comprises a set of inverters.

20. The system according to claim 4, wherein the comparator is an XOR.

* * * * *